US008432583B2

United States Patent
Hayashi (10) Patent No.: US 8,432,583 B2
(45) Date of Patent: Apr. 30, 2013

(54) IMAGE FORMING APPARATUS (75) Inventor: Shingo Hayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 681 days.

(21) Appl. No.: 12/556,930

(22) Filed: Sep. 10, 2009

(65) Prior Publication Data
US 2010/0060952 A1 Mar. 11, 2010

(30) Foreign Application Priority Data

Sep. 11, 2008 (JP) ................................ 2008-232910
Jun. 11, 2009 (JP) ................................ 2009-140077

(51) Int. Cl.
H04N 1/407 (2006.01)
H04N 1/04 (2006.01)
H04N 1/00 (2006.01)
H04N 1/46 (2006.01)
G06K 15/00 (2006.01)
G06K 9/46 (2006.01)
G06K 9/03 (2006.01)
G06F 3/12 (2006.01)

(52) U.S. Cl.
USPC ......... 358/3.26; 358/474; 358/1.14; 358/498; 358/1.15; 358/400; 358/1.1; 358/513; 382/309; 382/237

(58) Field of Classification Search .................. 358/474, 358/1.14, 1.15, 1.1, 498, 400
See application file for complete search history.

(56) References Cited

U.S. PATENT DOCUMENTS
2008/0037034 A1 * 2/2008 Ishii ............................... 358/1.1

FOREIGN PATENT DOCUMENTS
JP 2004-343621 12/2004
JP 2005-160019 6/2005
JP 3849905 9/2006

* cited by examiner

Primary Examiner — Charlotte M. Baker
Assistant Examiner — Rury Grisham
(74) Attorney, Agent, or Firm — Oblon, Spivak, McClelland, Maier & Neustadt, L.L.P.

(57) ABSTRACT

An image-data acquiring unit acquires image data of an image. An image processing unit performs a predetermined image processing on the image data. A signal generating unit generates a scanning signal for determining a section of the image data for performing the image processing. A signal control unit stores waveform information of a scanning signal in a normal operation as a control signal, compares the control signal with the scanning signal generated by the signal generating unit, and detects an abnormality of the scanning signal. A scan control unit determines whether the image processing is to be continued based on a result of detection by the signal control unit.

16 Claims, 5 Drawing Sheets

IMAGE FORMING APPARATUS

CROSS-REFERENCE TO RELATED APPLICATIONS

The present application claims priority to and incorporates by reference the entire contents of Japanese Patent Application No. 2008-232910 filed in Japan on Sep. 11, 2008 and Japanese Patent Application No. 2009-140077 filed in Japan on Jun. 11, 2009.

BACKGROUND OF THE INVENTION

1. Field of the Invention

The present invention relates to an image forming apparatus that includes an image scanning device.

2. Description of the Related Art

In image scanning devices that are included in copiers, scanners, and printers, or that are included in multifunction products (MFPs) having these functions, i.e., copying, scanning and printing functions, when an abnormality occurs in any one of the above-described devices, a typical method to cope with the abnormality is performed such that a portion or a cause of the abnormality is displayed on that device or terminals that are connected to a network are notified of the abnormality. Japanese Patent No. 3849905 and Japanese Patent Application Laid-open No. 2004-343621 disclose a technology for notifying the existence of an abnormality when a control unit, which controls a device, recognizes the status of a device and detects an abnormality.

The problem is that in the technology disclosed in Japanese Patent No. 3849905 and Japanese Patent Application Laid-open No. 2004-343621, accurate detection of the abnormality cannot be performed. In the image scanning device, because a scanning signal (i.e., a signal used by the device to determine a processing period in which the image processing using scanned image data is performed) that is created by the image scanning device is not monitored, there is a case in which an abnormality cannot be detected even when the scanning signal is abnormal. When the image scanning device cannot detect an abnormal state in which a scanning signal is not created or not output, an image processing unit that processes the scanned image data cannot start image processing, and therefore the image processing unit is kept waiting for an instruction to start image processing, which is a problem with conventional technology.

SUMMARY OF THE INVENTION

It is an object of the present invention to at least partially solve the problems in the conventional technology.

According to one aspect of the present invention, there is provided an image forming apparatus including an image scanning device that includes an image-data acquiring unit that scans an image of an original placed on an exposure glass and acquires image data of the image, an image processing unit that performs a predetermined image processing on the image data, a signal generating unit that generates a scanning signal for determining a section of the image data for performing the image processing, a signal control unit that stores therein waveform information of a scanning signal in a normal operation as a control signal, compares the control signal with the scanning signal generated by the signal generating unit, and detects an abnormality of the scanning signal based on a result of comparison, and a scan control unit that determines whether the image processing is to be continued based on a result of detection by the signal control unit. The image scanning device further includes a carriage that houses a scanning unit that scans the image of the original and a driving motor for driving the cartridge along the exposure glass during an optical scanning. In a platen scanning mode in which the original is manually placed on the exposure glass to scan the image of the original, the signal control unit compares the control signal with the scanning signal that is generated by the signal generating unit during an operation period of the driving motor.

Furthermore, according to another aspect of the present invention, there is provided an image forming apparatus including an image scanning device that includes a flatbed-type original conveying device that conveys an original onto a predetermined position of an exposure glass, an image-data acquiring unit that scans an image of the original conveyed and placed on the predetermined position of the exposure glass and acquires image data of the image, an image processing unit that performs a predetermined image processing on the image data, a signal generating unit that generates a scanning signal for determining a section of the image data for performing the image processing, a signal control unit that stores therein waveform information of a scanning signal in a normal operation as a control signal, compares the control signal with the scanning signal generated by the signal generating unit, and detects an abnormality of the scanning signal based on a result of comparison, and a scan control unit that determines whether the image processing is to be continued based on a result of detection by the signal control unit. The image scanning device further includes a carriage that houses a scanning unit that scans the image of the original and a driving motor for driving the cartridge along the exposure glass during an optical scanning. In an automatic scanning mode using the flatbed-type original conveying device, the signal control unit compares the control signal with the scanning signal that is generated by the signal generating unit during an operation period of the driving motor.

Moreover, according to still another aspect of the present invention, there is provided an image forming apparatus including an image scanning device that includes a sheet-through original conveying device that automatically conveys an original onto an exposure glass, an image-data acquiring unit that scans an image of the original conveyed onto the exposure glass and acquires image data of the image, an image processing unit that performs a predetermined image processing on the image data, a signal generating unit that generates a scanning signal for determining a section of the image data for performing the image processing, a signal control unit that stores therein waveform information of a scanning signal in a normal operation as a control signal, compares the control signal with the scanning signal generated by the signal generating unit, and detects an abnormality of the scanning signal based on a result of comparison, and a scan control unit that determines whether the image processing is to be continued based on a result of detection by the signal control unit. In an automatic scanning mode using the sheet-through original conveying device, the signal control unit compares the control signal with the scanning signal that is generated by the signal generating unit for a period during which the sheet-through original conveying device conveys or discharges the original.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
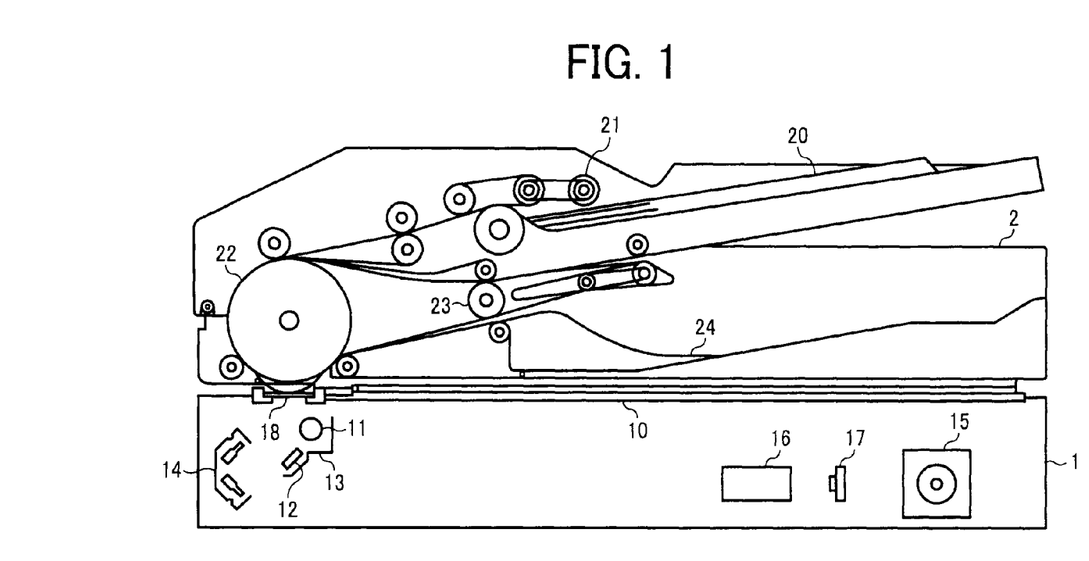
FIG. 1 is a side view of an internal configuration of an MFP using a sheet-through type image scanning device according to an embodiment of the present invention.

FIG. 1 is a side view of an internal configuration of an MFP including a sheet-through type image scanning device according to an embodiment of the present invention. The MFP includes an image scanning device 1 and a sheet-through document feeder (DF) 2. The MFP used in the embodiment includes a copying function and a scanning function; however, the configuration is not limited thereto. For example, a copier and a scanner having a single function can be applied to the embodiment.

The image scanning device 1 includes a platen exposure glass 10, an exposure lamp 11, a first mirror 12, a carriage 13, a second mirror and a third mirror 14, a driving motor 15 driven by a stepping motor, a lens 16, a charge coupled device (CCD) 17, and a sheet-through document-feeding exposure glass 18.

The sheet-through DF 2 includes a sheet-through original table 20, a pair of sheet-through feeding rollers 21, a guiding roller 22, a discharging roller 23, and an original delivery table 24.

The platen exposure glass 10 is arranged at an upper portion of the image scanning device 1 and used for placing originals. The exposure lamp 11 and the first mirror 12 are secured to the carriage 13. The driving motor 15 moves the carriage 13 and the second and the third mirrors 14 along a surface of the platen exposure glass 10. The original is irradiated with light and optically scanned. The light reflected from the original is guided to the CCD 17, whereby an image of the original formed via the lens 16 is photoelectrically converted to image data. The sheet-through document-feeding exposure glass 18 is used when a sheet-through DF scanning mode is operated. The original conveyed through the sheet-through DF 2 is scanned at the sheet-through document-feeding exposure glass 18.

In the sheet-through DF 2, the original placed on the sheet-through original table 20 is fed to a predetermined position on the sheet-through document-feeding exposure glass 18 by the sheet-through feeding rollers 21 and the guiding roller 22. The original that is fed to the predetermined position on the sheet-through document-feeding exposure glass 18 is scanned by the image scanning device 1 while being conveyed by the guiding roller 22. The scanned original is discharged to the original delivery table 24 by the guiding roller 22 and the discharging roller 23.

Figure 2:
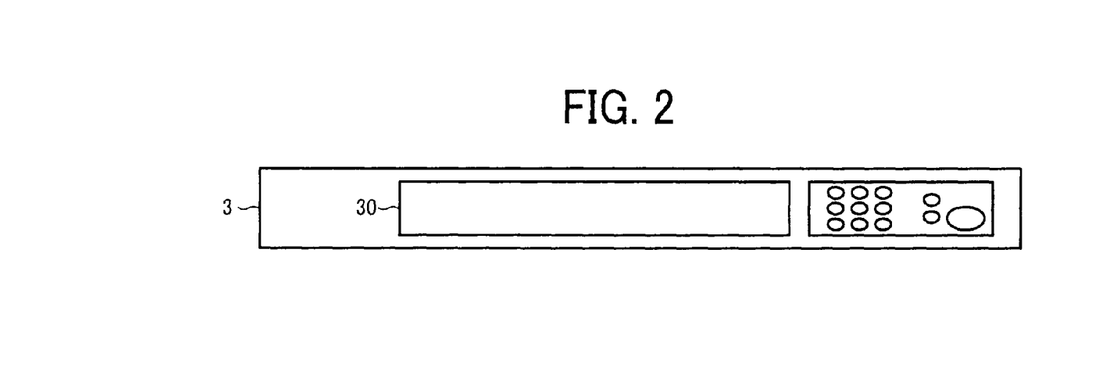
FIG. 2 is a schematic diagram of an example configuration of an operation panel of the image scanning device according to the embodiment.

The image scanning device 1 includes an operation panel 3. FIG. 2 is a schematic diagram of an example configuration of the operation panel 3. The operation panel 3 includes a touch panel 30. The touch panel 30 includes a panel display unit 102 that sets the number of copies to be made and displays an alarm when an abnormal state occurs.

Figure 3:
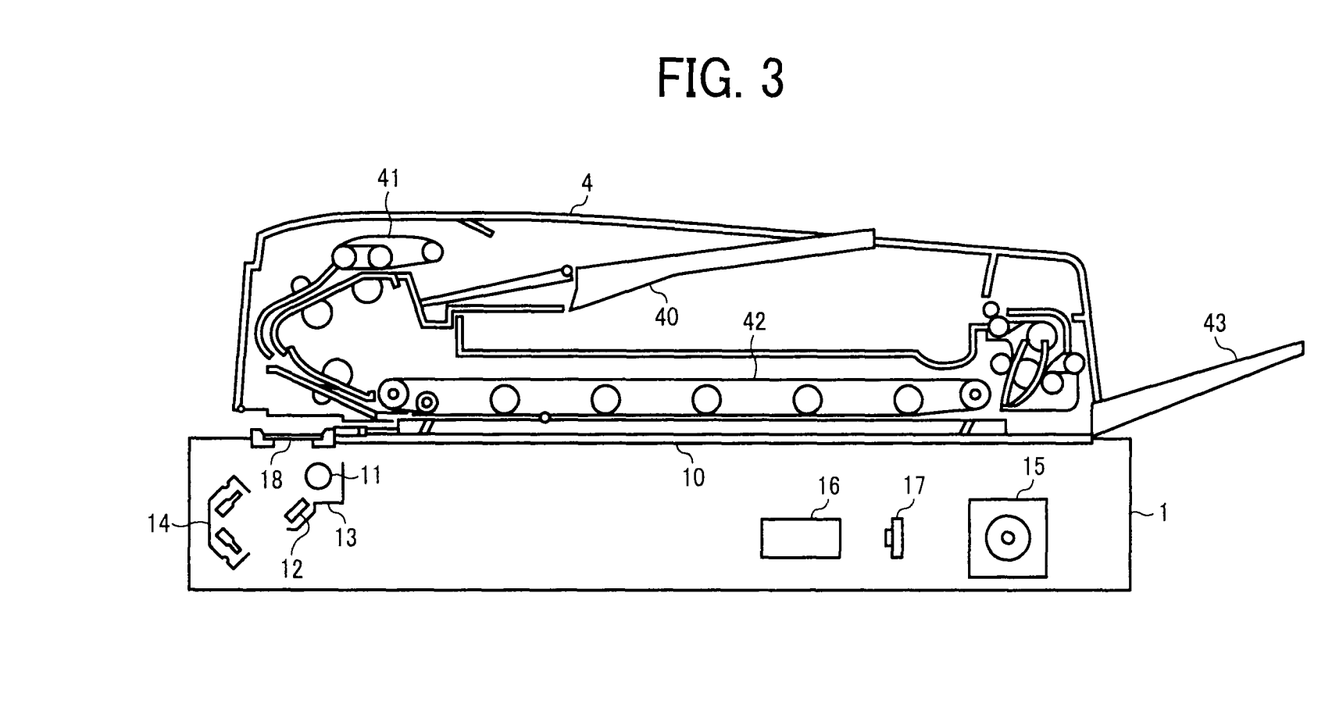
FIG. 3 is a schematic diagram of an example configuration of the MFP using a flatbed-type image scanning device according to the embodiment.

FIG. 3 is a schematic diagram of an example configuration of the MFP including a flatbed-type image scanning device according to the embodiment. The MFP includes the image scanning device 1 and a flatbed DF 4.

The flatbed DF 4 includes a flatbed original table 40, a plurality of flatbed feeding rollers 41, a conveying belt 42, and a discharge tray 43.

In the flatbed DF 4, the original placed on the flatbed original table 40 is fed and conveyed to a predetermined position on the platen exposure glass 10 by the flatbed feeding rollers 41 and the conveying belt 42. The original is scanned at this position by the image scanning device 1. The scanned original is discharged to the discharge tray 43 via the conveying belt 42.

Figure 4:
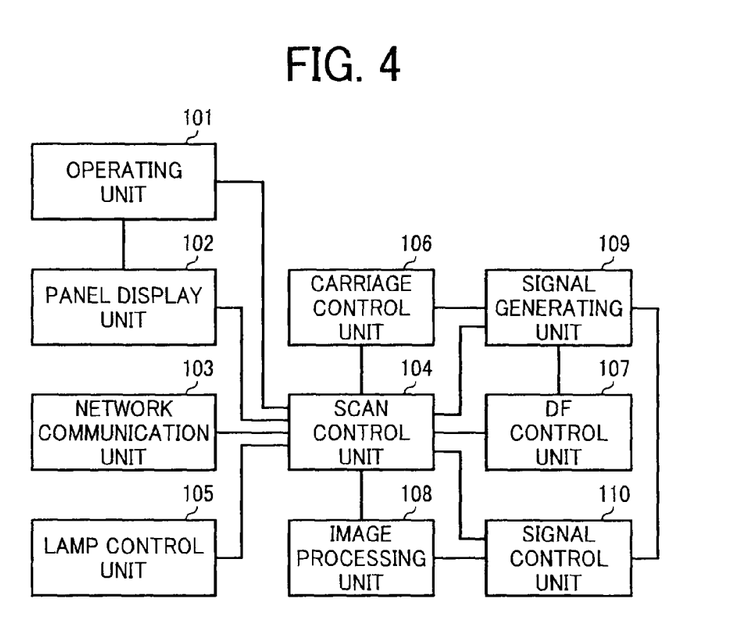
FIG. 4 is a block diagram of an example system configuration of the image scanning device according to the embodiment.

FIG. 4 is a block diagram of an example system configuration of the image scanning device 1. The image scanning device 1 includes an operating unit 101, the panel display unit 102, a network communication unit 103, a scan control unit 104, a lamp control unit 105, a carriage control unit 106, a DF control unit 107, an image processing unit 108, a signal generating unit 109, and a signal control unit 110.

The operating unit 101 receives an operation request from a user. In the panel display unit 102, the number of copies to be made is set and a warning is displayed when an abnormality occurs. The network communication unit 103 communicates via a network and gives the warning to a network user. The scan control unit 104 controls the DF control unit 107 according to controls of the lamp control unit 105, the carriage control unit 106, and a scanning mode and acquires image data that is photoelectrically converted from the original image. The lamp control unit 105 controls the exposure lamp 11.

To control the carriage 13, the carriage control unit 106 controls an operation of the driving motor 15. The DF control unit 107 controls an operation of automatic feeding of the original performed by the sheet-through DF 2 or the flatbed DF 4. The image processing unit 108 performs various kinds of image processing on the image data that is photoelectrically converted. The signal generating unit 109 generates (hereinafter, "assert") a scanning signal that is used for determining length of an image processing period and invalidates (hereinafter, "negate") the scanning signal. The signal control unit 110 compares the scanning signal received from the signal generating unit 109 with a control signal that is controlled by the signal control unit 110 and detects an abnormality of the scanning signal.

The image scanning device 1 has three operation modes for scanning an image: a platen scanning mode, a sheet-through DF scanning mode, and a flatbed DF scanning mode. In the platen scanning mode, a stationary original that is placed on the platen exposure glass 10 is scanned while the carriage 13 arranged below the original is moved (MFP in FIGS. 1 and 3). In the sheet-through DF scanning mode, the original that is moved by the sheet-through DF 2 is scanned using the sheet-through DF 2, with the carriage 13 being stopped at a sheet-through DF scanning position (MFP in FIG. 1). In the flatbed DF scanning mode, the original is scanned in combination of the above two modes using the flatbed DF 4 (MFP in FIG. 3).

Each of the operation modes is described below. An image scanning operation in the platen scanning mode is described first. When the user presses a print key in the operating unit 101, the operating unit 101 creates an image scanning request and outputs the request. An image scanning operation is started by scanning a target surface of the original that faces the platen exposure glass 10.

The scan control unit 104 that receives the image scanning request controls the lamp control unit 105 and the carriage control unit 106 and acquires the photoelectrically converted image data by irradiating the original with light to obtain an image and the obtained image is focused on the CCD 17. The signal generating unit 109 asserts the scanning signal when the carriage 13 reaches a leading edge of the original and negates the scanning signal when the carriage 13 reaches a trailing edge of the original based on a pulse count created when the carriage control unit 106 controls the driving motor 15 to operate the carriage 13.

The image processing unit 108 cuts out the image data, from among the photoelectrically converted image data, in which the scanning signal is asserted by the signal generating unit 109. The image processing unit 108 subjects the cut-out image data to a various kinds of image processing, for example, shading correction that optically corrects image distortion, dot correction, gamma correction, and filter processing.

Figure 5:
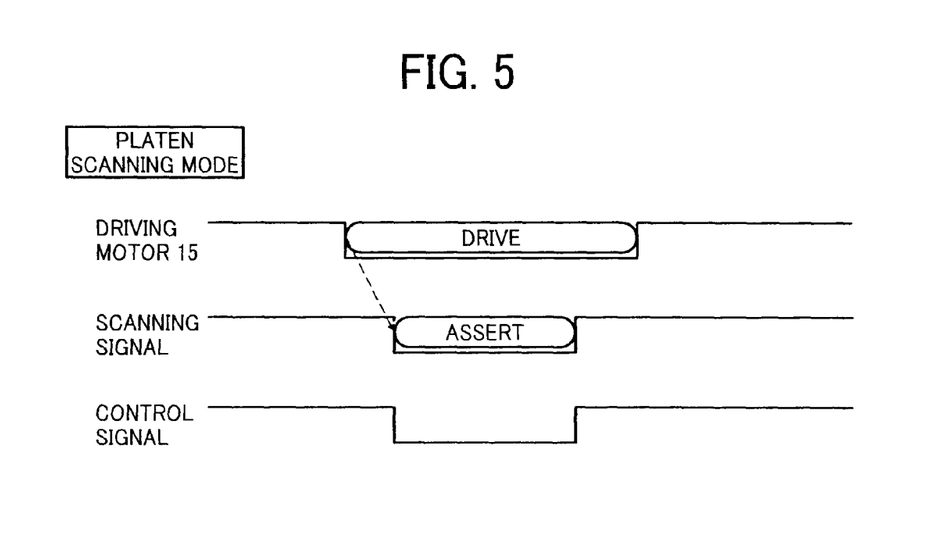
FIG. 5 is a timing chart of an operation in a platen scanning mode.

FIG. 5 is a timing chart of the operation timing, in the platen scanning mode, explaining the relation among the driving motor 15, the scanning signal, and the control signal. In FIG. 5, a first waveform represents whether the driving motor 15 is in operation. When the driving motor 15 is in operation, the carriage control unit 106 moves the carriage 13. A second waveform represents the scanning signal that is output from the signal generating unit 109. A third waveform represents the control signal that is controlled by the signal control unit 110. The signal generating unit 109 asserts the scanning signal a predetermined period of time after the driving motor 15 starts running. Waveforms of the scanning signal and the control signal are equal during a normal operation.

The scan control unit 104 displays information, such as the number of copies to be made, on the panel display unit 102. The scan control unit 104 also communicates with a terminal that is connected to the network via the network communication unit 103. When an abnormality occurs, the scan control unit 104 displays the abnormality on the panel display unit 102 or notifies the terminal of the abnormality via the network communication unit 103, or alternatively the scan control unit 104 performs both of them.

An image scanning operation in the sheet-through DF scanning mode is described next. When the user presses the print key in the operating unit 101, the operating unit 101 creates an image scanning request and outputs the request. Upon receiving the image scanning request, the scan control unit 104 controls the DF control unit 107 and feeds the original placed on the sheet-through DF 2 to a predetermined position.

The scan control unit 104 acquires the image data, which is photoelectrically converted from the original, by controlling the lamp control unit 105, the carriage control unit 106, and the DF control unit 107. The signal generating unit 109 asserts the scanning signal when the leading edge of the original reaches a predetermined position of the sheet-through document-feeding exposure glass 18 and negates the scanning signal when the trailing edge of the original reaches a predetermined position of the sheet-through document-feeding exposure glass 18 based on a pulse count created when the DF control unit 107 controls the sheet-through DF 2.

The image processing unit 108 cuts out the image data, from among the photoelectrically converted image data, in which the scanning signal is asserted by the signal generating unit 109 and subjects the cut-out image data to a various kinds of image processing. The DF control unit 107 discharges the scanned original by controlling the sheet-through DF 2.

Figure 6:
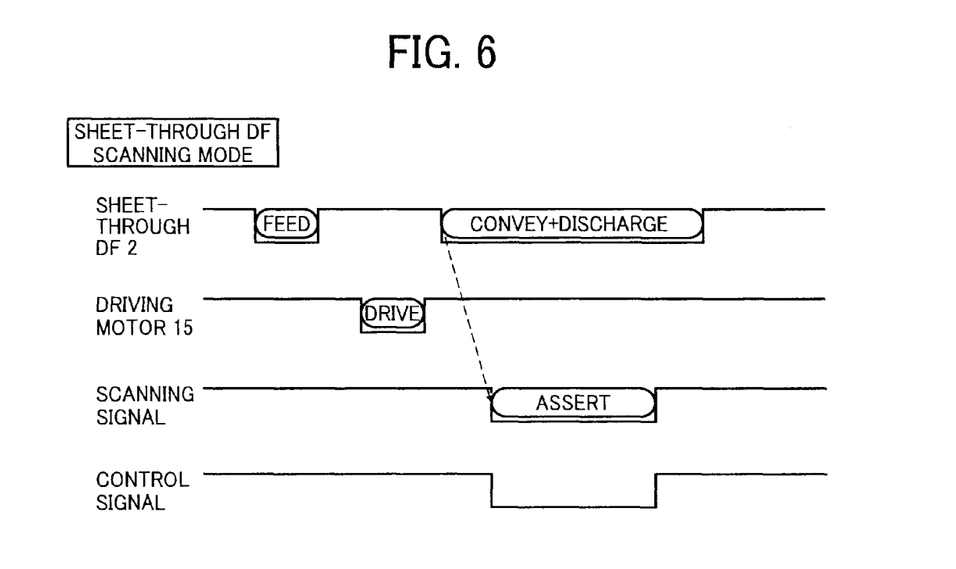
FIG. 6 is a timing chart of an operation in a sheet-through DF scanning mode.

FIG. 6 is a timing chart of the operation timing, in the sheet-through DF scanning mode, explaining the relation among the sheet-through DF 2, the driving motor 15, the scanning signal, and the control signal. In FIG. 6, a first waveform represents a feeding period and a discharge period of the sheet-through DF 2 that is controlled by the DF control unit 107. The signal generating unit 109 asserts the scanning signal a predetermined period of time after the sheet-through DF 2 starts conveying the original. Waveforms of the scanning signal and the control signal are equal during a normal operation.

The operations of the panel display unit 102 and the network communication unit 103 in the sheet-through DF scanning mode are the same as those in the platen scanning mode; therefore, descriptions thereof are omitted herefrom.

An image scanning operation in the flatbed DF scanning mode is described. When the user presses the print key in the operating unit 101, the operating unit 101 creates an image scanning request and outputs the request. The scan control unit 104 that receives the image scanning request controls the DF control unit 107 and feeds the original placed on the flatbed DF 4 to a predetermined position.

The scan control unit 104 acquires the image data, which is photoelectrically converted from the original, by controlling the lamp control unit 105 and the carriage control unit 106. The signal generating unit 109 asserts the scanning signal when the carriage 13 reaches the leading edge of the original and negates the scanning signal when the carriage 13 reaches the trailing edge of the original based on a pulse count created when the carriage control unit 106 controls the driving motor 15 to operate the carriage 13.

The image processing unit 108 cuts out the image data, from among the photoelectrically converted image data, in which the scanning signal is asserted by the signal generating unit 109 and subjects the cut-out image data to a various kinds of image processing, e.g., shading correction and gamma correction. When the signal generating unit 109 negates the scanning signal, upon receiving a request from the scan control unit 104, the DF control unit 107 discharges the scanned original by controlling the flatbed DF 4.

Figure 7:
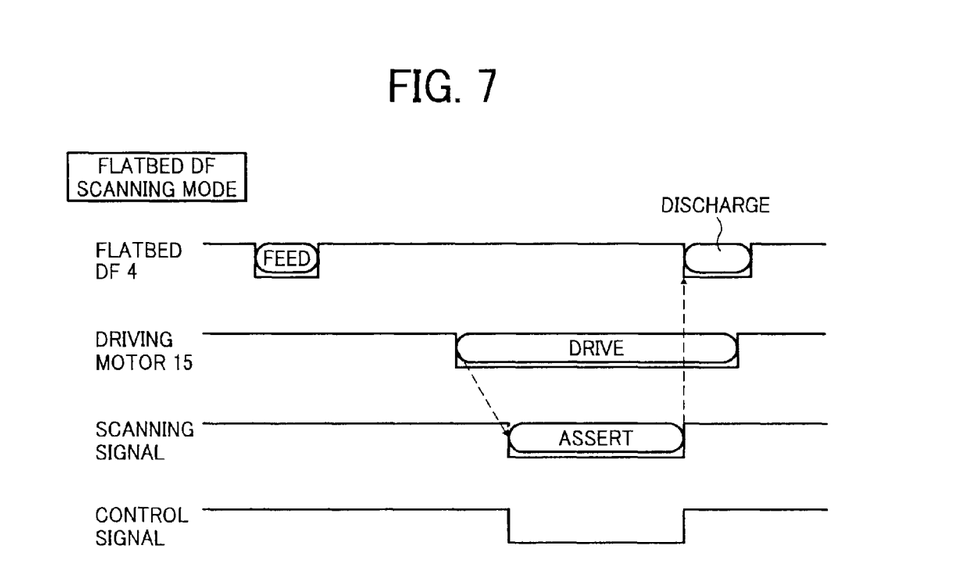
FIG. 7 is a timing chart of an operation in a flatbed DF scanning mode.

FIG. 7 is a timing chart of the operation timing, in the flatbed DF scanning mode, explaining the relation among the flatbed DF 4, the driving motor 15, the scanning signal, and the control signal. In FIG. 7, a first waveform represents a feeding period and a discharge period of the flatbed DF 4 controlled by the DF control unit 107. The signal generating unit 109 asserts the scanning signal a predetermined period of time after the driving motor 15 starts running. The flatbed DF 4 discharges the scanned original at a timing of the scanning signal being negated. Waveforms of the scanning signal and the control signal are equal during a normal operation.

The operations of the panel display unit 102 and the network communication unit 103 in the flatbed DF scanning mode are the same as those in the platen scanning mode; therefore, descriptions thereof are omitted herefrom.

Figure 8:
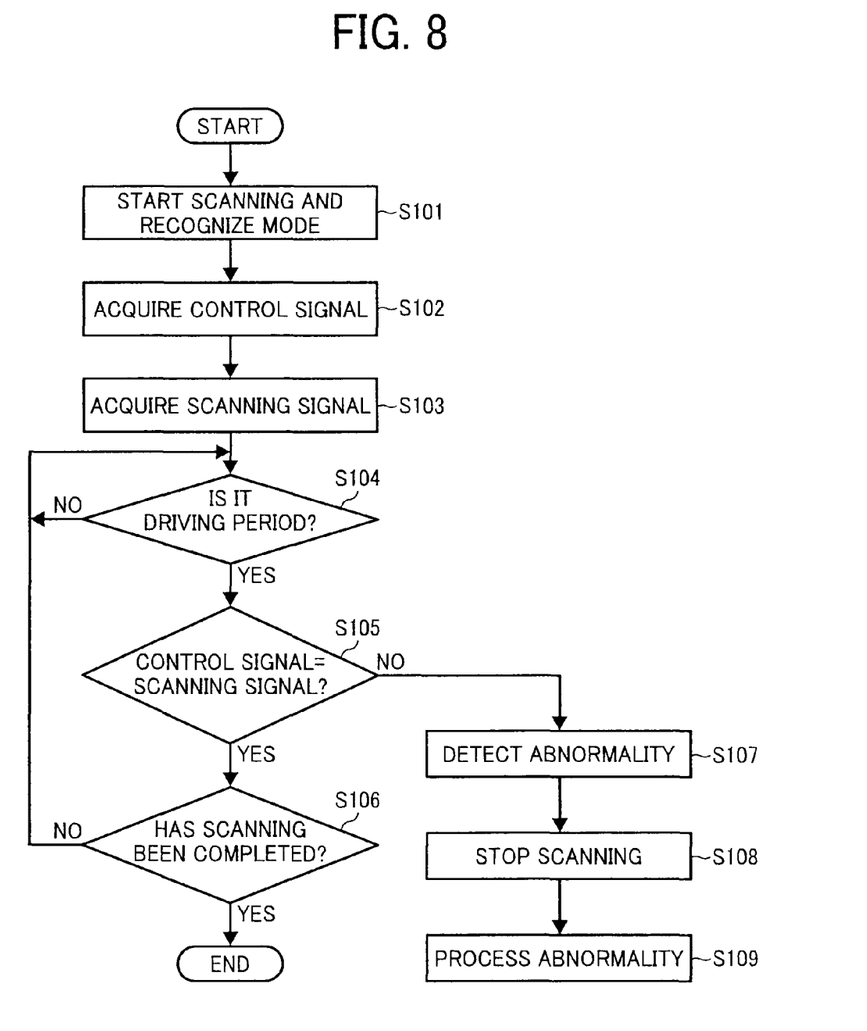
FIG. 8 is a flowchart for explaining an example operation of the image scanning device according to the embodiment.

Based on the above-described configuration and the operation of the image scanning device 1, the operation featured in the image scanning device 1 according to the embodiment is described with reference to a flowchart shown in FIG. 8. The operation is performed by the image scanning device 1 shown in FIG. 1 or FIG. 3. The scan control unit 104 integrally executes the control of the operation (see FIG. 4). In FIG. 8, when the user presses a start button (not shown) in the operating unit 101, the image scanning device 1 starts the scanning operation. The image scanning device 1 receives a notification of a scanning mode that is used at that time from the scan control unit 104 and identifies the current scanning mode from among the platen scanning mode, the sheet-through DF scanning mode, and the flatbed DF scanning mode (Step S101). The image scanning device 1 acquires the control signal that is obtained during a normal operation and is stored in the signal control unit 110 in advance (Step S102). The image scanning device 1 further acquires the scanning signal that is generated by the signal generating unit 109 (Step S103). The image scanning device 1 determines whether the driving motor 15 is in operation (Step S104). If the image scanning device 1 determines that the scanning signal is obtained during the driving period of the driving motor 15 (Yes at Step S104), the image scanning device 1 compares the control signal with the scanning signal and determines whether the control signal and the scanning signal are equal (Step S105). If the control signal and the scanning signal are equal (Yes at Step S105), the image scanning device 1 continues the scanning operation, determines whether the scanning operation is completed (Step S106), and completes a series of the operation when completion of scanning processing. The image scanning device 1 subjects the scanned image data to image forming processing, whereby an image is formed on a recording sheet. When the sheet-through DF scanning mode is used, because the scanning operation is performed by moving the original with the carriage 13 being fixed, the above-described Step S104 can be skipped.

If the image scanning device 1 determines that the control signal and the scanning signal are not equal (No at Step S105), the image scanning device 1 recognizes that the scanning signal is abnormal (Step S107), stops the scanning operation (Step S108), and performs predetermined processing for coping with the abnormality (specific description is described later) (Step S109).

Detailed operation is described below. Using any one of the above-described modes, when the scanning signal is abnormal due to an abnormality occurred during the image scanning operation, the signal control unit 110 detects the abnormality of the scanning signal, which is a feature of the embodiment. Because the signal control unit 110 detects the abnormality of the scanning signal, optimum image processing can be performed. The scan control unit 104 that receives a notification of the abnormality of the scanning signal can appropriately instruct the image processing unit 108 to stop or continue the image processing based on an operation state of the driving motor 15 or the sheet-through DF 2.

Specific methods of detecting the scanning signal detected by the signal control unit 110 and instructing the scan control unit 104 to stop or continue the image processing in a suitable manner for each scanning operation mode is described below. Using the platen scanning mode, a method of detecting the abnormality of the scanning signal and providing a suitable instruction to stop and continue the image processing are described.

The signal control unit 110 recognizes the current scanning mode is the platen scanning mode based on the notification from the scan control unit 104. The signal control unit 110 has, in advance, information about an ideal waveform of the scanning signal in the platen scanning mode, which should be generated by the signal generating unit 109, and uses the scanning signal as the control signal in the platen scanning mode. The signal control unit 110 compares the control signal with scanning signal that is in the platen scanning mode and that is output from the signal generating unit 109. If a result of the comparison indicates that the control signal and scanning signal are not equal, the signal control unit 110 determines the abnormality occurs in the scanning signal.

If the signal control unit 110 detects the abnormal scanning signal based on a result of comparison, the signal control unit 110 notifies the scan control unit 104 of the abnormality. By receiving the notification, the scan control unit 104 instructs the image processing unit 108 to stop or continue the image processing.

The scan control unit 104 determines that the image scanning operation is performed during the driving period of the driving motor 15 because the carriage control unit 106 controls the carriage 13. Accordingly, the scan control unit 104 instructs the image processing unit 108 to continue the image processing even when the scan control unit 104 receives the notification of the abnormality of the scanning signal.

After the scan control unit 104 receives a result of comparison indicating that the control signal and the scanning signal are not equal, for a period during which the driving motor 15 is not driven, the carriage control unit 106 does not operate the carriage 13 and the signal generating unit 109 does not assert the scanning signal. The scan control unit 104 recognizes that the scanning signal is not generated for the period during which the driving motor 15 is not driven and determines that the image processing needs not be performed in the image processing unit 108, thus instructing the image processing unit 108 to stop the image processing.

As described above, the image scanning device 1 according to the embodiment compares the control signal with the scanning signal and determines whether the abnormality of the scanning signal occurs based on the comparison result, which makes it possible to give a suitable instruction to stop or continue the image processing. With such a suitable instruction, a standby state in which the image processing unit 108 is kept waiting for an image processing instruction can be avoided, which is a problem in conventional technology. However, an output image could be abnormal due to a stop of the image processing unit 108.

When receiving the notification that the abnormality of the scanning signal is detected, the scan control unit 104 displays the warning indicating the occurrence of scan abnormality and information about the abnormal state of the output image on the panel display unit 102 or notifies the terminal connected to the network via the network communication unit 103. Alternatively, the scan control unit 104 performs both of them. Accordingly, because the scan control unit 104 gives an instruction to stop the image processing and then gives the warning of the abnormality, the user recognizes that the abnormality occurs in the image scanning device 1 and an abnormal/normal state of the output image.

When the scanning signal and the control signal are equal, the signal control unit 110 notifies the scan control unit 104 of that state. The scan control unit 104 does not perform any particular processing at this time because the status is the same as that of the normal operation.

Using the sheet-through DF scanning mode, a method of detecting the abnormal scanning signal and providing a suitable instruction to stop and continue the image processing are described.

The signal control unit 110 recognizes that the current scanning mode is the sheet-through DF scanning mode based on the notification from the scan control unit 104. The signal control unit 110 has, in advance, information about an ideal waveform of the scanning signal in the sheet-through DF scanning mode, which should be created by the signal generating unit 109, and uses the scanning signal as the control signal in the sheet-through DF scanning mode. The signal control unit 110 compares the control signal with the scanning signal that is in the sheet-through DF scanning mode and that is output from the signal generating unit 109. If a result of the comparison indicates that the control signal and scanning signal are not equal, the signal control unit 110 determines that the abnormality occurs in the scanning signal.

If the signal control unit 110 detects the abnormal scanning signal based on the comparison result, the signal control unit 110 notifies the scan control unit 104 of the abnormality. By receiving the notification, the scan control unit 104 instructs the image processing unit 108 to stop the image processing.

The scan control unit 104 determines that the image scanning operation is performed during a conveyance period or a discharge period of the sheet-through DF 2. Accordingly, the scan control unit 104 instructs the image processing unit 108 to continue the image processing even when the scan control unit 104 receives the notification of the abnormality of the scanning signal.

After the scan control unit 104 receives a result of comparison indicating that the control signal and the scanning signal are not equal, the signal generating unit 109 does not assert the scanning signal for a period during which the sheet-through DF 2 does not convey or discharge the original. Accordingly, the scan control unit 104 recognizes that the scanning signal is not generated for that period and determines that the image processing needs not be performed in the image processing unit 108, thus instructing the image processing unit 108 to stop the image processing.

In the sheet-through DF scanning mode, in a similar manner as in the platen scanning mode, the image scanning device 1 according to the embodiment compares the control signal with the scanning signal and determines whether the abnormality of the scanning signal occurs based on the comparison result, which makes it possible to give a suitable instruction to stop or continue the image processing. With such a suitable instruction, the standby state in which the image processing unit 108 is kept waiting for the image processing instruction can be avoided, which is a problem in conventional technology. However, an output image could be abnormal due to a stop of the image processing unit 108.

The process of providing the warning when an abnormality occurs is the same as that in the platen scanning mode. The process that is performed when the scanning signal and the control signal are equal is the same as that in the platen scanning mode. Accordingly, descriptions thereof are omitted herefrom.

Using the flatbed DF scanning mode, a method of detecting the abnormal scanning signal and providing a suitable instruction to stop and continue the image processing are described.

The signal control unit 110 recognizes the current scanning mode is the flatbed DF scanning mode based on the notification from the scan control unit 104. The signal control unit 110 has, in advance, information about an ideal waveform of the scanning signal in the flatbed DF scanning mode, which should be generated by the signal generating unit 109, and uses the scanning signal as the control signal in the flatbed DF scanning mode. The signal control unit 110 compares the control signal with the scanning signal that is in the flatbed DF scanning mode and that is output from the signal generating unit 109. If a result of the comparison indicates that the control signal and scanning signal are not equal, the signal control unit 110 determines the abnormality occurs in the scanning signal.

If the signal control unit 110 detects the abnormal scanning signal based on the comparison result, the signal control unit 110 notifies the scan control unit 104 of the abnormality. By receiving the notification, the scan control unit 104 instructs the image processing unit 108 to stop the image processing.

The scan control unit 104 determines that the image scanning operation is performed during the driving period of the driving motor 15 because the carriage control unit 106 controls the carriage 13. Accordingly, the scan control unit 104 instructs the image processing unit 108 to continue the image processing even when the scan control unit 104 receives the notification of the abnormality of the scanning signal. Thereafter, the scan control unit 104 controls the DF control unit 107 to discharge the original.

After the scan control unit 104 receives the result of comparison indicating that the control signal and the scanning signal are not equal, for the period during which the driving motor 15 is not driven, the carriage control unit 106 does not operate the carriage 13 and the signal generating unit 109 does not assert the scanning signal. Accordingly, the scan control unit 104 recognizes that the scanning signal is not generated for that period and determines that the image processing needs not be performed in the image processing unit 108, thus instructing the image processing unit 108 to stop the image processing. Thereafter, the scan control unit 104 controls the DF control unit 107 to discharge the original.

In the flatbed DF scanning mode, in a similar manner as in the platen scanning mode and the sheet-through DF scanning mode, the image scanning device 1 according to the embodiment compares the control signal with the scanning signal and determines the abnormality of the scanning signal based on the comparison result, which makes it possible to give a suitable instruction to stop or continue the image processing. With such a suitable instruction, the standby state in which the image processing unit 108 is kept waiting for the image processing instruction can be avoided, which is a problem in conventional technology. However, an output image could be abnormal due to a stop of the image processing unit 108.

The process of providing the warning when an abnormality occurs is the same as that in the platen scanning mode. The process that is performed when the scanning signal and the control signal are equal is the same as that in the platen scanning mode. Accordingly, descriptions thereof are omitted herefrom.

In the above explanation, it has been mentioned that the image scanning device 1 according to the embodiment compares the scanning signal that is output from the signal generating unit 109 with the control signal that contains information about the scanning signal that is controlled by the signal control unit 110 and obtained during a normal operation. With this configuration, when the scanning signal and the control signal are not equal, the image scanning device 1 determines that the abnormality occurs in the scanning signal; therefore, the abnormality of the scanning signal can be detected. When the abnormality of the scanning signal is detected, based on the operation state of the driving motor 15 or the sheet-through DF 2, the image scanning device 1 can give a suitable instruction to stop or continue the image processing.

According to one aspect of the present invention, an abnormality of a scanning signal can be reliably detected.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising an image scanning device that includes:
    an image-data acquiring unit that scans an image of an original placed on an exposure glass and acquires image data of the image;
    an image processing unit that performs a predetermined image processing on the image data;
    a signal generating unit that generates a scanning signal for determining a section of the image data for performing the image processing;
    a signal control unit that stores in advance therein waveform information of a scanning signal in a normal operation as a control signal, compares the control signal with the scanning signal generated by the signal generating unit, and detects an abnormality of the scanning signal based on a result of comparison;
    a scan control unit that determines whether the image processing is to be continued based on a result of detection by the signal control unit,
    a carriage that houses a scanning unit that scans the image of the original; and
    a driving motor for driving the carriage along the exposure glass during an optical scanning, wherein
    in a platen scanning mode in which the original is manually placed on the exposure glass to scan the image of the original, the signal control unit compares the control signal with the scanning signal that is generated by the signal generating unit during an operation period of the driving motor, and
    waveforms of the scanning signal and the control signal match during a normal operation of the image forming apparatus.

2. The image forming apparatus according to claim 1, wherein
    when the scan control unit receives a notification that the signal control unit detects the abnormality of the scanning signal, the scan control unit instructs the image processing unit to continue the image processing during the operation period of the driving motor and to stop the image processing during a stop period of the driving motor.

3. The image forming apparatus according to claim 1, further comprising
    a display control unit that displays information on the abnormality and information on an abnormality of an output image.

4. The image forming apparatus according to claim 3, further comprising
    a network communication unit that notifies the information on the abnormality and the information on the abnormality of the output image to a terminal connected to a network.

5. The image forming apparatus according to claim 1, wherein:
    the signal generating unit asserts the scanning signal when the scanning unit detects a leading edge the original and negates the scanning signal when the scanning unit detects a trailing edge of the original based on a pulse count created by irradiating the original with light and photoelectrically converting the corresponding image data, and
    the scanning signal corresponds to an area having a width and a height which is extracted from the image data to undergo image processing.

6. An image forming apparatus comprising an image scanning device that includes:
    a flatbed-type original conveying device that conveys an original onto a predetermined position of an exposure glass;
    an image-data acquiring unit that scans an image of the original conveyed and placed on the predetermined position of the exposure glass and acquires image data of the image;
    an image processing unit that performs a predetermined image processing on the image data;
    a signal generating unit that generates a scanning signal for determining a section of the image data for performing the image processing;
    a signal control unit that stores in advance therein waveform information of a scanning signal in a normal operation as a control signal, compares the control signal with the scanning signal generated by the signal generating unit, and detects an abnormality of the scanning signal based on a result of comparison;
    a scan control unit that determines whether the image processing is to be continued based on a result of detection by the signal control unit;
    a carriage that houses a scanning unit that scans the image of the original; and
    a driving motor for driving the carriage along the exposure glass during an optical scanning, wherein
    in an automatic scanning mode using the flatbed-type original conveying device, the signal control unit compares the control signal with the scanning signal that is generated by the signal generating unit during an operation period of the driving motor, and
    waveforms of the scanning signal and the control signal match during a normal operation of the image forming apparatus.

7. The image forming apparatus according to claim 6, wherein,
    when the scan control unit receives a notification that the signal control unit detects the abnormality of the scanning signal, the scan control unit instructs the image processing unit to continue the image processing during the operation period of the driving motor and to stop the image processing during a stop period of the driving motor.

8. The image forming apparatus according to claim 7, wherein,
    after the scan control unit gives an instruction to the image processing unit, the scan control unit further gives an instruction to the flatbed-type original conveying device to discharge the original.

9. The image forming apparatus according to claim 6, further comprising
    a display control unit that displays information on the abnormality and information on an abnormality of an output image.

10. The image forming apparatus according to claim 9, further comprising
    a network communication unit that notifies the information on the abnormality and the information on the abnormality of the output image to a terminal connected to a network.

11. The image forming apparatus according to claim 6, wherein:

the signal generating unit asserts the scanning signal when the scanning unit detects a leading edge the original and negates the scanning signal when the scanning unit detects a trailing edge of the original based on a pulse count created by irradiating the original with light and photoelectrically converting the corresponding image data, and the scanning signal corresponds to an area having a width and a height which is extracted from the image data to undergo image processing.

12. An image forming apparatus comprising an image scanning device that includes:

a sheet-through original conveying device that automatically conveys an original onto an exposure glass;

an image-data acquiring unit that scans an image of the original conveyed onto the exposure glass and acquires image data of the image;

an image processing unit that performs a predetermined image processing on the image data;

a signal generating unit that generates a scanning signal for determining a section of the image data for performing the image processing;

a signal control unit that stores in advance therein waveform information of a scanning signal in a normal operation as a control signal, compares the control signal with the scanning signal generated by the signal generating unit, and detects an abnormality of the scanning signal based on a result of comparison; and a scan control unit that determines whether the image processing is to be continued based on a result of detection by the signal control unit, wherein in an automatic scanning mode using the sheet-through original conveying device, the signal control unit compares the control signal with the scanning signal that is generated by the signal generating unit for a period during which the sheet-through original conveying device conveys or discharges the original, and waveforms of the scanning signal and the control signal match during a normal operation of the image forming apparatus.

13. The image forming apparatus according to claim 12, further comprising a network communication unit that notifies the information on the abnormality and the information on the abnormality of the output image to a terminal connected to a network.

14. The image forming apparatus according to claim 12, wherein, when the scan control unit receives a notification that the signal control unit detects the abnormality of the scanning signal, the scan control unit instructs the image processing unit to continue the image processing for the period during which the sheet-through original conveying device conveys or discharges the original and to stop the image processing for a period during which the sheet-through original conveying device does not convey or discharge the original.

15. The image forming apparatus according to claim 14, further comprising a display control unit that displays information on the abnormality and information on an abnormality of an output image.

16. The image forming apparatus according to claim 12, wherein:

the signal generating unit asserts the scanning signal when the image-data acquiring unit detects a leading edge the original and negates the scanning signal when the image-data acquiring unit detects a trailing edge of the original based on a pulse count created by irradiating the original with light and photoelectrically converting the corresponding image data, and the scanning signal corresponds to an area having a width and a height which is extracted from the image data to undergo image processing.

* * * * *